United States Patent [19]

Vance

[11] Patent Number: 4,606,628

[45] Date of Patent: Aug. 19, 1986

[54] VIDEO PROJECTOR LENS ANGULATION MECHANISM

[75] Inventor: Dennis W. Vance, Portola Valley, Calif.

[73] Assignee: Vivid Systems Incorporated, Fremont, Calif.

[21] Appl. No.: 678,151

[22] Filed: Dec. 4, 1984

[51] Int. Cl.⁴ .............................................. G03B 3/00
[52] U.S. Cl. .................................... 353/101; 358/231
[58] Field of Search ............... 353/100, 101; 358/225, 358/227, 250, 231, 237; 350/255

[56] References Cited

U.S. PATENT DOCUMENTS

| | | | |
|---|---|---|---|
| 154,607 | 9/1974 | Holmes | 353/101 X |
| 181,626 | 8/1976 | Bourquin et al. | 353/101 |
| 1,954,876 | 4/1934 | Joannides | 353/101 X |
| 2,285,768 | 6/1942 | Drucker | 353/101 X |
| 4,293,878 | 10/1981 | Sanchez | 358/231 |

Primary Examiner—Harry N. Haroian
Attorney, Agent, or Firm—Kolisch, Hartwell & Dickinson

[57] ABSTRACT

A video projector lens angulation mechanism for use with a video projector and a projection lens is provided. The mechanism includes a support for providing both horizontal and vertical rotation of the lens relative the projector and provides an adjustment for adjusting the horizontal and vertical inclination of the lens and positively holding the lens in an adjusted position.

8 Claims, 3 Drawing Figures 4,606,628

VIDEO PROJECTOR LENS ANGULATION MECHANISM

BACKGROUND AND SUMMARY OF THE INVENTION

The instant invention relates to a distortion-reducing mechanism for use with a projector. Specifically, the instant invention is a lens-angulation mechanism which facilitates inclination of a projection lens relative to a projector to eliminate distortion in a projected image.

Projectors, and specifically video projectors, may be used to display, on a large, generally planar screen, an image generated by a computer or by a television receiver. The projector is generally placed on a table or stand at some distance from a screen and the image is projected onto the screen. If the projector is placed on a stand at a level below the center of the screen, it is necessary to incline the projector upwards to center the image on the screen. This results in distortion in that the distance between the projector and the bottom of the image is less than the distance between the projector and the top of the image, with the result being that the top of the image is enlarged relative the bottom of the image.

One known technique to resolve this problem is to tilt the screen thereby aligning, in a parallel manner, the screen and the projector. Tilting the screen is not possible with most conventional projection screens, and screens which are tiltable are either provided in a permanent installation or are specialty items of considerable cost. Known projectors allow limited lens angulation.

An object of the instant invention is to provide a lens angulation mechanism which enables projection of a distortion-free image onto a planar projection screen when the projector is not aligned in a parallel manner with the projection screen.

Another object of the instant invention is to provide a lens angulation mechanism which rotatably and pivotally supports a projection lens and allows inclination in both a horizontal and vertical plane.

A further object of the instant invention is to provide a lens angulation mechanism which adjusts the inclination of the lens and positively holds the lens in an adjusted position.

Another object of the instant invention is to provide a lens angulation mechanism which is simple in construction and low in initial and maintenance costs.

Yet another object of the instant invention is to provide a lens angulation mechanism which is usable by one with little skill or instruction.

The instant invention includes a lens angulation mechanism comprising projection means having a frame and a projection lens with front and rear ends. Support means are operatively interposed between the lens and the frame. In the preferred embodiment, support means include a universal hinge having one element mounted adjacent the rear end of the lens and another element mounted on the frame. The term "universal" as used herein is intended to cover a hinge which is capable of movement in more than one plane. A ball and cup arrangement is normally provided for permitting movement along two perpendicular axes. Lens inclination adjustment means are also provided to positively adjust the inclination of the lens with respect to the frame and to positively locate the lens in an adjusted position.

These and other objects and advantages of the instant invention will become more fully apparent as the description which follows is read in conjunction with the drawings.

DETAILED DESCRIPTION OF THE PREFERRED EMBODIMENT

Figure 2:
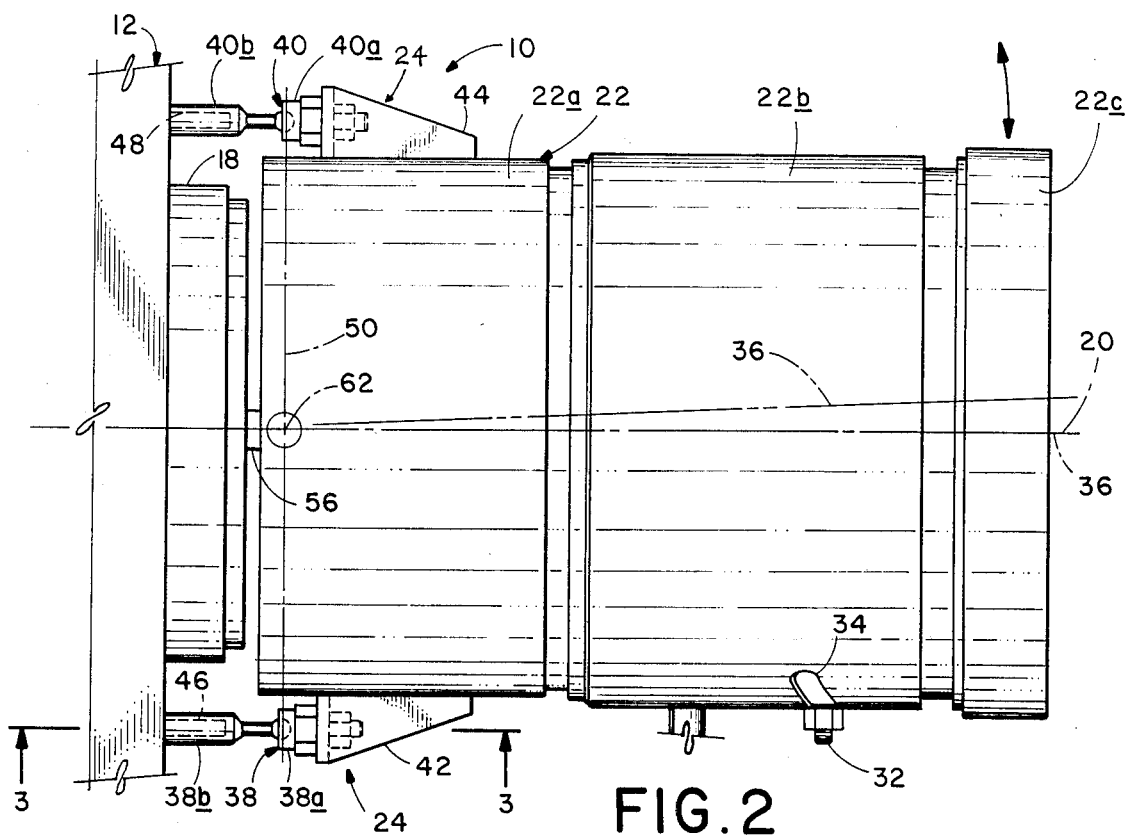
FIG. 2 is a top plan view of the projector of FIG. 1, with portions deleted for clarity.
Figure 1:
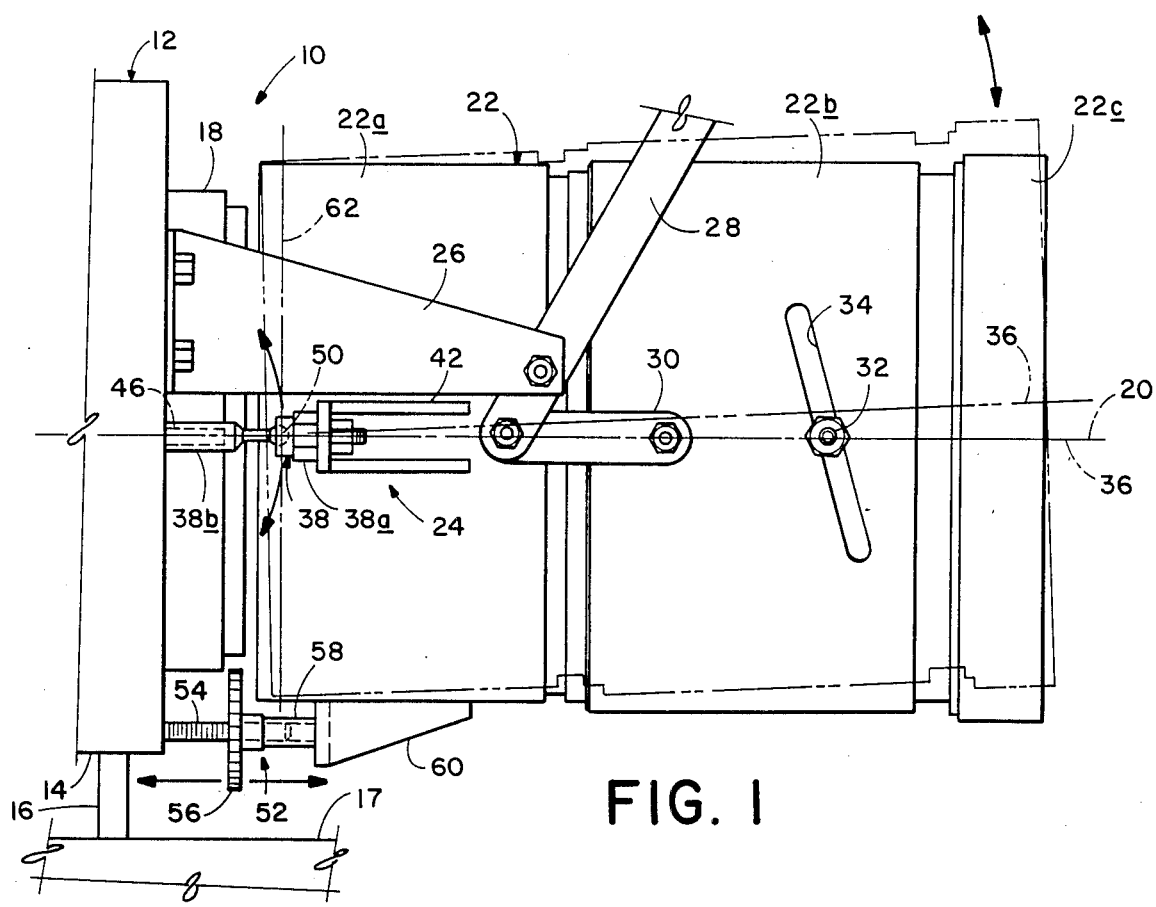
FIG. 1 is a side elevation of a video projector incorporating the lens angulation mechanism of the instant invention.

Turning now to the drawings, and initially to FIGS. 1 and 2, a video projector incorporating a lens angulation mechanism is shown generally at 10. Projector or projection means 10 includes a frame 12 having a base 14 and frame inclination means 16. Frame inclination means 16 takes the form of an adjustable leg, which may be extended or retracted to vary the vertical inclination of base 14 and hence frame 12 relative a projection stand 17.

Enclosed within frame 12 is imaging means 18. Imaging means in the preferred embodiment is a television projector which is mounted adjacent one end of frame 12 and generates an image beam having an axis of projection 20. Axis of projection 20 is parallel to the plane defined by the periphery of base 14. A projection lens 22 is mounted on frame 12 by support means, shown generally at 24. Lens 22 is of the twin-focusing type, which is well known in the video projection art. Lens 22 is focused by means of a focusing mechanism which includes a frame bracket 26, focusing lever 28 and connection arm 30. Bracket 26, focusing lever 28 and connection arm 30 have been deleted from FIG. 2 for purposes of clarity. Lens 22 includes a collar portion 22a, a first focusing portion 22b and a second focusing portion 22c. Details of lens 22 and the focusing mechanism therefore may be found in my copending application Ser. No. 678,035, entitled Video Projector Focus Adjustment Mechanism and filed on this same date, which is incorporated herein by reference.

Lens 22, in the preferred embodiment, is a cylindrical, elongate structure. The lens has a central axis, or central focal axis 36, which, when the lens is in a neutral position, is coaxial with axis of projection 20.

Support means 24 is interposed between lens 22 and frame 12 to pivotally and rotationally support lens 22 relative frame 12. Specifically, the support means supports one end 22a of the lens adjacent imaging means 18.

Support means 24, also referred to herein as horizontal and vertical lens rotation means, includes a pair of universal hinges, shown generally at 38 and 40. The hinges in the preferred embodiment are of the ball and cup type. The cup portion 38a, 40a of each hinge is secured to a pair of flanges 42, 44, respectively, mounted on opposed sides of the rear, or one end, of lens 22. Another element of each universal hinge is the ball portion 38b, 40b, which is threadably received on threaded studs 46, 48, respectively. Studs 46, 48 are also referred to herein as threadable means. The studs are secured to frame 12 adjacent imaging means 18. Ball portions 38b, 40b also provide means for adjusting the horizontal inclination of lens 22, which will be described in greater detail later herein.

Support means provides a means for pivotally and rotationally supporting the lens on the frame. As illustrated in FIG. 2, lens 22 is supported at opposed points on sides of lens portion 22a. A first or vertical pivot axis 50 is defined by the hinge point of universal hinges 38 and 40. Pivot axis 50 is parallel to base 14 and provides a point about which central axis 36 may be rotated.

Lens inclination adjustment means are provided for positively adjusting the inclination of lens 22 with respect to frame 12. The adjustment means includes means for adjusting the vertical inclination of the lens which includes threaded means 52 interposed between lens 22 and frame 12. In the preferred embodiment, threaded means 52 includes a jack-screw arrangement or jack-screw means having a threaded shaft 54 secured to frame 12, a knurled adjustment ring 56 which includes a medial portion conformally threaded to shaft 54, and a hollow shaft 58 which is secured to a flange 60 mounted on lens portion 22a. Operation of adjustment ring 56 positively locates and holds the lens in an adjusted position relative frame 12.

Figure 3:
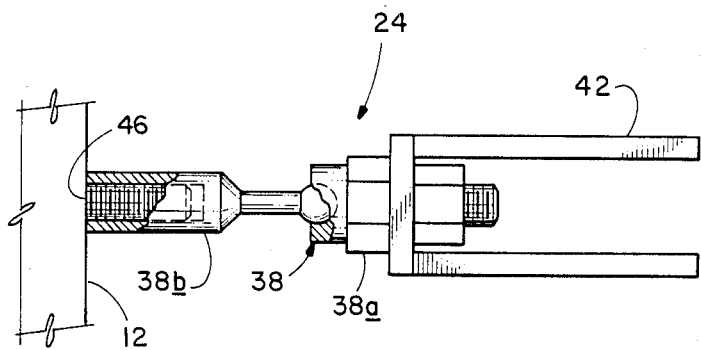
FIG. 3 is an enlarged, partially broken away view of a universal hinge, taken along the line 3—3 in FIG. 2.

As previously noted, elements 38b, 40b of universal hinges 38, 40 provide means for adjusting the horizontal inclination of lens 22. Referring now to FIGS. 1 and 3, element 38b, for instance, may be rotated, thereby unscrewing a portion of element 38b from stud 46. Operation of element 38b or 40b again positively locates and holds the lens in an adjusted position relative the frame. This allows rotation of central focal axis 36 substantially about a second, or horizontal, pivot axis 62. Axis 62 is perpendicular to base 14 when lens 22 is in an aligned, or neutral position. It can be seen that the horizontal and vertical pivot axes are mutually orthogonal and are substantially orthogonal with axis of projection 20 when lens 22 is in a neutral position.

In use, the projector would be placed on stand 17 and the image created by the imaging means 18 directed towards a suitable screen (not shown). The lens is focused by initially adjusting first focusing portion 22b by means of lever 28 and connecting arm 30 and then focusing the second focusing portion 22c by twisting portion 22c relative portion 22b such that pin 32 travels within slot 34 causing portion 22c to move fore and aft relative portion 22b. If the image is distorted, as by the upper and lower margins of the image having different lengths, or by the right and left sides of the image having different lengths, the distortion is reduced or eliminated by the lens inclination adjustment means. It is possible by use of the lens inclination adjustment means to adjust lens 22 independently of the frame inclination means 16 about the pivot axes 50, 62 previously described, thereby to control the relative alignment of axis of projection 20 and focal axis 36. Focal axis 36 may be aligned and misaligned with axis of projection 20, and such misalignment is shown in phantom lines in FIGS. 1 and 2. The phantom line in FIG. 1 displays a vertical inclination of lens 22 relative frame 12, accomplished by rotation of ring 56. The phantom line in FIG. 2 illustrates misalignment by adjusting other element 38b thereby horizontally displacing focal axis 36.

If, for instance, the top of the image is larger than the bottom of the image, ring 56 is adjusted, thereby rotating lens 22 about axis 50, raising the focal axis at the forward end of the lens in an upward direction, until the top and bottom of the image is substantially equal. Likewise, elements 38b and 40b may be adjusted to equalize the right and left sides of the image as required. Thus the support means provides both horizontal and vertical lens rotation means.

Although a preferred embodiment of the invention has been disclosed, it is to be appreciated that variations and modifications may be made without departing from the spirit of the invention.

It is claimed and desired to secure by Letters Patent:

1. A lens angulation mechanism comprising:
projection means having a frame;
a projection lens with front and rear ends;
support means operatively interposed between said lens and said frame, said support means including a universal hinge having one element mounted adjacent said rear end of said lens and another element mounted on said frame and allowing movement in more than one plane, said support means further including horizontal lens rotation means and vertical lens rotation means for displacing said lens along horizontal and vertical axes; and
adjustment means for adjusting the inclination of said lens and positively holding said lens in an adjusted position.

2. A lens angulation mechanism comprising:
projection means having a frame;
a projection lens with front and rear ends;
support means operatively interposed between said lens and said frame, said support means including a universal hinge having one element mounted adjacent said rear end of said lens and another element mounted on said frame and allowing movement in more than one plane;
adjustment means for adjusting the inclination of said lens and positively holding said lens in an adjusted position;
wherein said projection means transmits an image having an axis of projection, said support means includes means for pivotally supporting, at opposed points, said lens relative to said frame about a pivot axis wherein said pivot axis and said axis of projection are orthogonal; and
wherein said frame includes frame inclination means for varying the inclination of said frame, and said adjustment means adjust the inclination of the lens independently of the inclination of said frame.

3. The mechanism of claim 2, wherein said frame has a planar base, said inclination means adjust the vertical inclination of said base, and said pivot axis is parallel to said base.

4. In combination with a video projector which transmits an image about an axis of projection, the projector having a frame and a projection lens having a central axis, a lens angulation mechanism comprising:
support means for pivotally supporting the lens on the frame about first and second pivot axes;
adjustment means operable positively to control the relative alginment of the axis of projection and the central axis; and
wherein the frame has a base, the periphery of which defines a base plane, said first pivot axis is substantially parallel to said base plane and said second pivot axis is substantially normal to said base plane.

5. In combination with a video projector which transmits an image about an axis of projection, the projector having a frame and a projection lens having a central axis, a lens angulation mechanism comprising:

support means for pivotally supporting the lens on the frame about first and second pivot axis;

adjustment means operable positively to control the relative alignment of the axes of projection and the central axis; and wherein said adjustment means includes jack-screw means interposed between the projector frame and one end of the projection lens.

6. In combination with a video projector which transmits an image about an axis of projection, the projector having a frame and a projection lens having a central axis, a lens angulation mechanism comprising:

support means for pivotally supporting the lens on the frame about first and second pivot axes;

adjustment means operable positively to control the relative alignment of the axis of projection and the central axis; and wherein said support means includes a universal hinge having one element pivotally attached adjacent one end of the lens and another element threadably attached to the frame, said elements operably connected for facilitating rotation of the lens about said pivot axes.

7. The mechanism of claim 6, wherein said adjustment means includes said other element operable to adjust the horizontal inclination of the lens about said second pivot axis and jack-screw means operable to adjust the vertical inclination of the lens about said first pivot axis.

8. A video projector comprising:

a frame having a base, the periphery of which defines a base plane, and frame inclination means for adjusting the vertical inclination of said frame;

imaging means for transmitting an image beam, said beam having an axis of projection substantially parallel to said base plane;

a projection lens having a front end, a rear end and a central focal axis, for focusing said beam on a generally planar screen spaced apart from the projector;

a pair of universal hinges, each of which has one element pivotally mounted adjacent said rear end of said lens and another element mounted on said frame adjacent said imaging means, said hinges defining pivot points and pivotally supporting, at opposed points, said lens relative said frame about first and second pivot axes, said axes being mutually orthogonal and substantially orthogonal with said axis of projection, said first pivot axis being substantially parallel to said base plane and passing through said pivot points, and said second pivot axis being substantially orthogonal to said base plane, said hinges facilitating rotation of said central axis about said first pivot axis; and lens inclination adjustment means for adjusting the inclination of said lens about said pivot axes and positively locating said lens relative said frame, said lens inclination adjustment means including threadable means associated with said universal hinges for adjusting the vertical inclination of said lens about said first pivot axis, and for adjusting the horizontal inclination of said lens about said second pivot axis.

* * * * *